US009065345B2

(12) United States Patent
Rigbers et al.

(10) Patent No.: US 9,065,345 B2
(45) Date of Patent: Jun. 23, 2015

(54) TRANSFORMERLESS INVERTER COMPRISING A DC/DC CONVERTER

(75) Inventors: Klaus Rigbers, Kassel (DE); Regine Mallwitz, Kassel (DE); Bernd Engel, Wolfenbuettel (DE); Peter Zacharias, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 509 days.

(21) Appl. No.: 13/163,940

(22) Filed: Jun. 20, 2011

(65) Prior Publication Data

US 2011/0267863 A1    Nov. 3, 2011

Related U.S. Application Data

(63) Continuation-in-part of application No. PCT/EP2009/058363, filed on Jul. 2, 2009.

(30) Foreign Application Priority Data

Dec. 20, 2008  (EP) ..................................... 08022223

(51) Int. Cl.
*H02M 7/537* (2006.01)
*H02M 3/335* (2006.01)
*H02M 1/00* (2007.01)

(52) U.S. Cl.
CPC ........ *H02M 3/33523* (2013.01); *Y02B 70/1433* (2013.01); *Y02E 10/56* (2013.01); *H02M 2001/0058* (2013.01); *Y02B 70/1491* (2013.01)

(58) Field of Classification Search
USPC ....................................... 363/21.02, 131–132
See application file for complete search history.

(56) References Cited

U.S. PATENT DOCUMENTS

| 5,619,406 A * | 4/1997 | Divan et al. ..................... 363/98 |
| 2003/0169027 A1 * | 9/2003 | Croce et al. ................... 323/286 |

(Continued)

FOREIGN PATENT DOCUMENTS

| CA | 2431689 A1 | 12/2004 |
| DE | 102004037446 A1 | 6/2006 |

(Continued)

OTHER PUBLICATIONS

International Search Report Dated Jun. 21, 2011 for Application No. PCT/EP2009/058363. 13 Pages.

(Continued)

*Primary Examiner* — Adolf Berhane
*Assistant Examiner* — Henry Lee, III
(74) *Attorney, Agent, or Firm* — Eschweiler & Associates, LLC

(57) ABSTRACT

A transformerless inverter that serves to feed electricity from a DC current source into an AC power grid, has an inverter bridge and a DC/DC converter connected upstream of the inverter bridge. The DC/DC converter converts an input DC voltage that is present between two input lines of the inverter into a DC link voltage present between two input lines of the inverter bridge. The inverter bridge converts the DC link voltage present at the input lines thereof into an output AC voltage. The DC/DC converter includes at least one resonant circuit that has a resonance inductance and a resonance capacitance and is connected on its input side via at least two clocked switches to one of the two input lines of the inverter or an intermediate potential line carrying a potential in between. The input lines of the inverter and the input lines of the inverter bridge are galvanically isolated from one another by a capacitive method. The resonant circuit may be undivided and is connected alternately to the two input lines of the inverter bridge.

26 Claims, 9 Drawing Sheets

(56) References Cited

U.S. PATENT DOCUMENTS

| | | | |
|---|---|---|---|
| 2007/0047277 A1* | 3/2007 | Konishi et al. | 363/131 |
| 2007/0133241 A1* | 6/2007 | Mumtaz et al. | 363/131 |
| 2009/0034304 A1 | 2/2009 | Engel et al. | |

FOREIGN PATENT DOCUMENTS

| | | | |
|---|---|---|---|
| EP | 1143594 | A2 | 10/2001 |
| EP | 1369985 | A2 | 12/2003 |
| EP | 2023475 | A1 | 2/2009 |
| GB | 2419968 | A | 5/2006 |
| WO | 0180411 | A1 | 10/2001 |
| WO | 2010069620 | A1 | 6/2010 |

OTHER PUBLICATIONS

Klaassens J B: "Power Conditioning with a Switched Series—Resonant Circuit Operating at a High Internal Frequency", Telecommunications Energy Conference, 1987 Intelec '87 the Ninth International, IEEE, Piscataway, NJ, USA, Jun. 14, 1987, pp. 193-203.

Severns R: "Topologies for three element resonant converters" 19900311; 19900311-19900316, Mar. 11, 1990, Seiten 712-722.

* cited by examiner

TRANSFORMERLESS INVERTER COMPRISING A DC/DC CONVERTER

REFERENCE TO RELATED APPLICATIONS

This application is a continuation-in-part application of International Application No. PCT/EP2009/058363, filed Jul. 2, 2009, that claims priority to European Patent Application No. 08 022 223.5, filed Dec. 20, 2008.

FIELD

The invention relates to a transformerless inverter for feeding electric energy from a DC current source into an AC power grid, the inverter comprising an inverter bridge and a DC/DC converter connected upstream of the inverter bridge.

BACKGROUND

A transformerless inverter for feeding electric energy from a DC current source into an AC power grid comprising an inverter bridge and a DC/DC converter connected upstream of the inverter bridge is known from EP 2 023 475 A1. Here, the DC/DC converter provides at least two bipolar output voltages, which are additively superimposed between the input lines of the inverter bridge with regard to a grounded center point. Particularly, each resonant circuit is branched and comprises two partial resonance capacitances that are each connected to two oppositely oriented rectifier diodes at their output and that are thus alternately connected in an electrically conductive way to the lines of one part of a divided intermediate link to which the inverter bridge is connected. In this way, the known inverter comprises a basic conversion of the DC voltage present between the input lines of the inverter into an intermediate link voltage present at the input lines of the inverter bridge of 1:n, n being the total number of partial resonance capacitances towards which the resonant circuits are branched. In other words, n is the number of the parts of the divided intermediate link out of which the inverter bridge is fed. This basic conversion of the input DC voltage proves unfavourable when the known inverter is used for feeding electric energy from a photovoltaic panel into an AC power grid, if the DC voltage provided by the photovoltaic panel is already higher or at least nearly as high as the peak voltage of the AC power grid. The photovoltaic panels that are generally used today sometimes provide such high DC voltages that the peak voltage of an AC power grid to be fed is often exceeded by a multitude.

Not all embodiments of the transformerless inverters known from EP 2 023 475 A1 comprise a galvanic separation between the input lines of the inverter and the input lines of the inverter bridge. Instead, in some of the embodiments, grounding of the center point of the divided intermediate link and of one of the input lines of the inverter is provided, which grounding thus extends beyond the intermediate link. In the embodiments of the known inverter that provide a galvanic separation between the input lines of the inverter and the input lines of the inverter bridge in a capacitive way, a center point of the divided intermediate link which is connected to the input lines of the inverter bridge via capacitances is connected to a center point between the input lines of the inverter that is also connected to these input lines via capacitances. By means of this connection, a passive AC current backflow path is provided which, because of its pure capacitive connection to the input lines of the inverter, does not delete the galvanic separation between the input lines of the inverter and the input lines of the inverter bridge.

In the embodiments of the transformerless inverter known from EP 2 023 475 A1, in which the input lines of the inverter are galvanically separated from the input lines of the inverter bridge, a reference potential for the input DC voltage may be freely selected. However, there is the danger that the summation current of the currents flowing over the resonant circuit and the passive AC current backflow path is not zero so that undesired compensation currents flow via ground, which may be high.

A switched-mode power supply disclosed in WO 01/80411 A1 comprises an input circuit for periodically switching an input voltage or an input current on and off with a switching frequency, and a transmission circuit connected thereto. The transmission circuit is formed by a bandpass circuit consisting of at least one capacitor and at least one inductor, the resonant frequency of said bandpass circuit lying outside, especially above, the switching frequency of the input circuit.

There is a need for a transformerless inverter which is better suited for DC current sources that provide a high DC voltage as compared to the peak voltage of the AC power grid to be fed, and that provides further adaptation options.

SUMMARY

A transformerless inverter configured to feed electric energy from a DC current source into an AC power grid is disclosed. The inverter comprises an inverter bridge configured to receive an intermediate link DC voltage and generate an output AC voltage at an output thereof, and a DC/DC converter connected upstream of the inverter bridge. The DC/DC converter is configured to receive an input DC voltage present between two input lines of the inverter and convert the input DC voltage into the intermediate link DC voltage, and present the intermediate link DC voltage between two input lines of the inverter bridge. In one embodiment the DC/DC converter comprises at least one resonant circuit that comprises a resonance inductance and a resonance capacitance, wherein the resonant circuit at its input is selectively connected via each of at least two pulsed switches to one of the two input lines of the inverter or to an intermediate potential line at which a potential between the input lines of the inverter is present. In addition, the input lines of the inverter and the input lines of the inverter bridge are galvanically separated from one another in a capacitive way, wherein the resonant circuit is undivided, and wherein the resonant circuit, at its output, is connected to the two input lines of the inverter bridge.

In another embodiment, a transformerless inverter configured to feed electric energy from a DC current source into an AC power grid is disclosed. The inverter comprises an inverter bridge configured to receive an intermediate link DC voltage and generate an output AC voltage at an output thereof, and a DC/DC converter connected upstream of the inverter bridge. The DC/DC converter is configured to receive an input DC voltage present between two input lines of the inverter and convert the input DC voltage into the intermediate link DC voltage, and present the intermediate link DC voltage between two input lines of the inverter bridge. The inverter bridge is configured to invert the intermediate link DC voltage present at its input lines into the output AC voltage. The DC/DC converter comprises at least one resonant circuit that comprises a resonance inductance and a resonance capacitance, wherein the resonant circuit, at its input, is selectively connected via each of at least two pulsed switches to one of the two input lines of the inverter or an intermediate potential line at which an intermediate potential between the input lines of the inverter is present. In one embodiment the input lines of the inverter and the inputs lines of the inverter bridge are galvanically separated from one another in a capacitive way, and at least one AC current backflow path is connected to the input lines of the inverter or to the intermediate potential line at an input thereof, and to the input lines of the inverter bridge at an output thereof. The AC current backflow path comprises a capacitance having one terminal branching towards the input lines of the inverter or to the intermediate potential line, and having another terminal branching towards the two input lines of the inverter bridge.

BRIEF DESCRIPTION OF THE DRAWINGS

In the following, the invention will be explained and described in further detail by means of various embodiment examples of the new inverter.

DESCRIPTION

Figure 1:
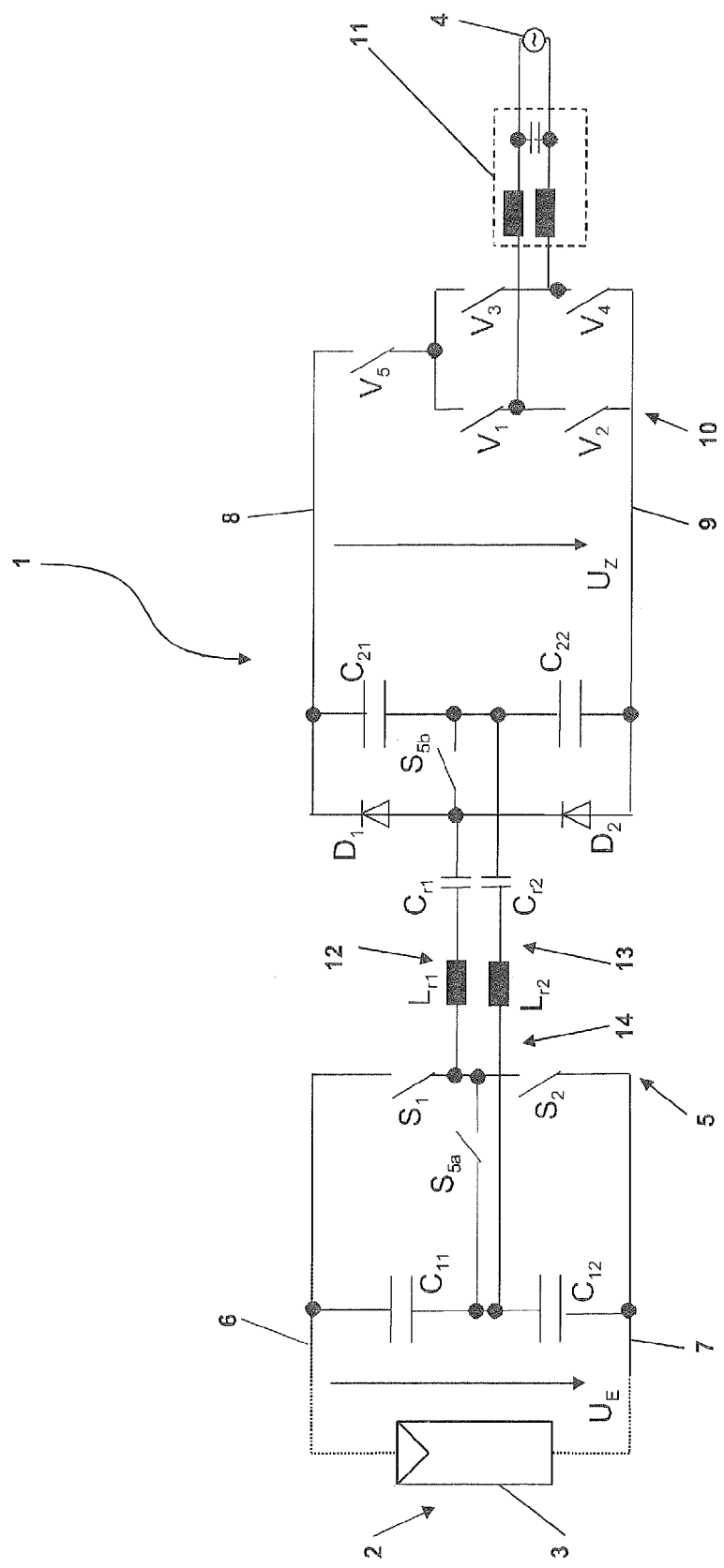
FIG. 1 illustrates an embodiment of a transformerless inverter of the present invention in which the DC/DC converter has a resonant circuit, and in which the inverter bridge is made as an H5 circuit.

In the description that follows, the DC current source may particularly be a photovoltaic system, for example in form of single photovoltaic panel or a plurality of photovoltaic panels. The DC current source may, however, also be a capacitor of a very high capacitance, a so-called supercap, a DC voltage generator, a fuel cell stack or the like. The AC power grid, into which electric energy from the DC current source is fed, may be a single-phase or multi-phase, particularly a three-phase, AC power grid. The AC power grid may either be a public power grid or an island power grid or any other thinkable variant of a power grid.

The present invention particularly relates to such inverters in which input lines of the whole inverter and input lines of an inverter bridge of the inverter are galvanically separated from each other in a capacitive way, i.e. by means of capacitors. Thus, the present invention particularly relates to such inverters which provide a galvanic separation of the DC current source from the AC power grid into which power is fed without using an interconnected transformer, i.e. to transformerless inverters.

In so far as the term "connectable", particularly in the form "connectable in an electrically conductive way", is used in the definition of the features of the present invention, this term does not relate to the trivial possibility of connecting the parts of the inverter mentioned in the context of this term in any (electrically conductive) way. Instead, the term refers to the fact that the respective connection is already prepared in the inverter and may simply be made, like for example by closing a switch or by a diode becoming electrically conductive, even if this is not explicitly detailed to further define the "connectability" in each case.

The terms "a capacitance", "one capacitance", and "the capacitance" and "capacitances" used in this application refer to one or more capacitors which may be connected in parallel or series to provide for an electric capacitance. "Capacitances" thus refers to a plurality of such arrangements of one or more capacitors. Likewise, the terms "an inductance", "one inductance", and "the inductance" used in this application refer to one or more inductors which may be connected in parallel or series to provide for an electric inductance. "Inductances" thus refers to a plurality of such arrangements of one or more inductors.

The term "potential" used in this application always refers refer to an electric potential of a particular object or at a particular point.

In the transformerless inverter of the present invention, the resonant circuit is undivided and alternately connectable to the two input lines of the inverter bridge in an electrically conductive way. This means that the intermediate link of the new inverter is also not divided. This is equivalent to the basic conversion of the inverter—besides the option to provide boost inverters—is 1:1 at maximum. Thus, it is particularly suited for DC current sources which provide a high input voltage. In the inverter of the present invention, the reference potential for the intermediate link voltage is also freely selectable. Particularly, the intermediate link voltage is not necessarily provided with regard to an grounded center point.

In operation of the inverter of the present invention, the potential of the input lines, and thus of a DC current source connected to the input lines, may be freely selected to suit the requirements of the DC current source. For example, certain photovoltaic generators that are used as DC current sources should completely be at a positive potential with regard to ground to avoid premature degradation. Other photovoltaic generators require a negative electric potential for being operated under optimum operation conditions.

That the resonant circuit is not divided does not mean here that the resonance capacitance may not be provided by two or more individual capacitors that are connected in series and/or in parallel, as long as a total capacitance at the output of the resonant circuit is undivided, i.e. as long as the resonant circuit does not comprise several separate outputs with several partial capacitances. In the inverter of the present invention, the order of the resonance inductance and the resonance capacitance may also be reversed so that the resonance capacitance is provided at the input and the resonance inductance is provided at the output of the resonant circuit. Even if this reversed order is not used in the following particular embodiment examples, it is of equal value as the order shown there.

In the inverter of the present invention, the resonant circuit of the DC/DC converter may be operated in a resonant mode. This means that the resonant circuit that has a resonance frequency may be operated at an operation frequency in a range from about 80% to about 120% of its resonance frequency. Typically, the resonant circuit is not operated exactly at its resonance frequency as a higher level of control of the DC/DC converter in varying the operation frequency for adjusting the intermediate link voltage is achieved at operation frequencies differing from the resonant frequency.

If the DC/DC converter has more than one resonant circuit, all resonant circuits should have the same resonance frequency and be operated at the same operation frequency. They may, however, be operated at phase offsets, particularly in a so-called interleaved mode.

Due to unavoidable tolerances of the electrical components used, the resonance frequency of several resonant circuits may not be exactly the same. This does not cause problems as the operation frequency deviates from the resonance frequency by some percent. Further, tolerances of the electrical components used may be compensated for by adjusting the actual operation frequency to, for example, a certain percentage of the actual resonance frequency.

Operating a resonant circuit at a certain operating frequency basically means that the pulsed switches via which the resonant circuit is connectable are pulsed at the operation frequency.

In the inverter of the present invention, the at least two pulsed switches via which the resonant circuit of the DC/DC converter is connectable are pulsed at a typical duty cycle in a range from 25% to 50%.

Particularly, in one embodiment the resonance frequency of the at least one resonant circuit of the DC/DC converter may be in a range from 15 kHz to 150 kHz. To achieve this resonance frequency, the resonance capacitance of the resonant circuit may be in a range from 100 nanofarad to 10 microfarad, and the resonance inductance of the resonant circuit may be in a range from 1 microhenry to 250 microhenry. An inductance of less than 100 microhenry may be desirable in one embodiment. A capacitance of about 1 microfarad or less is employed as a small capacitance helps in keeping currents low which tend to flow via ground in one embodiment.

Other measures to keep the currents flowing via ground low in operation of the inverter include operating the inverter bridge of the inverter in a mode that does not result in high frequency variations of the electric potential of the input lines of the inverter bridge, but in a continuous course of the potential of the input lines of the inverter bridge. With a three phase inverter, the inverter bridge may, for example, be operated with space vector modulation, whereas 60° flat top modulation is rather unsuitable. The inverter bridge may be operated to feed the electric power into the AC power grid at a power factor of 1 or of close to 1 in one embodiment.

No relevant potential variations occur at the input lines of the inverter of the present invention, which helps to keep capacitive ground currents low which may be a problem with large photovoltaic generators operated at varying electric potential with regard to earth.

In the transformerless inverter of the present invention, the resonance capacitance at the output of the resonant circuit may be connected to each of the two input lines of the inverter bridge via one rectifier diode, an electrically conductive connection being passively reached depending on the direction of the potential difference across the rectifier diodes. A better control of the new inverter results, if the resonance capacitance at the output of the resonant circuit is alternately connectable to the input lines of the inverter bridge in an electrically conductive way via pulsed switches. Free-wheeling diodes may be connected in parallel to these pulsed switches.

In the inverter of the present invention, cascading of the basic principle described up to now is possible in that several resonant circuits are connected in parallel with regard to each other to the two input lines of the inverter bridge. At their inputs, these resonant circuits are then, in each case via one pulsed switch, connected to one of the two input lines of the inverter at maximum and to one or two intermediate potential lines each comprising an intermediate potential. Beginning with the third resonant circuit, there is at least one resonant circuit that, at its input, via its two pulsed switches, is alternately connectable to two intermediate potential lines in an electrically conductive way. At its output, each such resonant circuit is also alternately connectable to the two input lines of the inverter bridge in an electrically conductive way.

In the transformerless inverter of the present invention, at least one AC current backflow path is provided that is connected or at least connectable in an electrically conductive way to the input lines of the inverter or the intermediate potential lines at its input, and to the input lines of the inverter bridge at its output. Via this AC current backflow path the current flowing over the DC/DC converter can be compensated. Here, it is of general importance, i.e. also an advantage, for example, in a divided intermediate link according to the prior art, that a capacitance is provided in the AC current backflow path between its branching towards the input lines of the inverter on the one hand, and its branching towards the input lines of the inverter bridge on the other hand, which capacitance galvanically separates the two branchings. This capacitance provides a galvanic separation independently of how the branchings of the AC current backflow path towards the lines at its input and its output are made in detail.

In one embodiment, one AC current backflow path is associated with each resonant circuit in the inverter of the present invention to feed back the current flowing over the resonant circuit to as far as possible an extent. At its input and its output, each of these resonant circuits is connected or connectable in an electrically conductive way to the same lines to which the associated resonant circuit is connectable in an electrically conductive way.

The AC current backflow path may be connected via two capacitances both to the input lines of the inverter or to the intermediate potential lines at its input, and to the input lines of the inverter bridge at its output. In this way, a completely passive AC current backflow path is provided. Several such AC current backflow paths may be connected via the same two capacitances to the input lines of the inverter bridge at their outputs.

In the inverter of the present invention, however, it is desirable in one embodiment to make the AC current backflow path as active as the resonant circuit in that it is connected to the input lines of the inverter or to the intermediate potential lines at its input, or to the input lines of the inverter bridge at its output via two switches to have further options with regard to influencing the intermediate link voltage and the current flowing over the intermediate link. On its respective other side, the AC current backflow path may be connected to the input lines of the inverter bridge or to the input lines of the inverter or to the intermediate potential lines, respectively, also via switches or only via rectifier diodes. So far as switches are provided at the input or at the output, freewheeling diodes may be connected in parallel to them. The input and output connections of the AC current backflow path may be designed free from the task of galvanic decoupling, as the galvanic decoupling is already provided by the capacitance arranged between its input and output branchings.

In the inverter of the present invention, it is desirable in one embodiment if not only a capacitance but also a resonance inductance is provided in the AC current backflow path between its input branching towards the input lines of the inverter or to the intermediate potential lines and its output branching towards the input lines of the inverter bridge, so that the AC current backflow path is made as a further resonant circuit. In general, this further resonant circuit may have the same characteristics as the associated resonant circuit. In the further resonant circuit, the order of the capacitance and of the resonance inductance is also irrelevant; particularly, it may be selected independently of the order of the resonance capacitance and the resonance inductance in the resonant circuit.

The inverter of the present invention comprises additional control options with regard to the intermediate link voltage, if at least one pulsed connection switch is provided between each resonant circuit and its associated AC current backflow path behind their branching towards the two input lines of the inverter or to the intermediate potential lines at the input and/or in front of their branching towards the two input lines of the inverter bridge at the output. Operating such a connection switch at the input has a voltage decreasing effect, and operating such a connection switch at the output has a voltage increasing effect. Instead of only one connection switch, for example, two connection switches connected in series at the input and/or at the output may also be provided, whose center point is connected to an intermediate potential which is defined by capacitances connected in series between the input lines of the inverter or the inverter bridge. Then, the inputs or outputs of the resonant circuit and of the associated AC current backflow path may not only be connected with each other but also individually with this intermediate potential.

The properties of the inverter of the present invention may also be enhanced in that each resonant circuit and the associated AC current backflow path are connected via a capacitance and/or an inductance at their outputs in front of their branchings towards the two input lines of the inverter bridge.

In a particular embodiment of the inverter of the present invention, each resonant circuit and the associated AC current backflow path, at their inputs, via two pulsed switches, are individually connectable in an electrically conductive way to one of the two input lines of the inverter or an intermediate potential line at which an intermediate potential is present, a further pulsed switch being provided in one of the input or intermediate potential lines. In this way, a so-called H5 circuit is realized at the input of the DC/DC converter in the inverter of the present invention. Such an H5 circuit may also be provided in the area of the inverter bridge of the inverter. Also, other known circuit concepts may be used in the DC/DC converter and the inverter bridge. For example, the DC/DC converter may be a three-level NPC (Neutral Point Clamped) converter. Other useable switching principles are known by the keywords "Heric" and "flying capacitor".

With an optimum design of the DC/DC converter with regard to its resonant circuits and its AC current backflow paths, and with a suitable operation mode of the inverter bridge, the current that still flows via ground in operation of the inverter of the present invention may be kept very small. For example, its effective value may be kept smaller than 100 mA even with a photovoltaic generator connected to the input lines of the inverter as the DC current source, that displays a generator capacitance of 2 microfarad with regard to ground.

To even further reduce ground currents in the new inverter, a current which still flows off via all resonant circuits and all AC current backflow paths, i.e. the non-balanced summation current, which would have otherwise to be compensated via ground, may be compensated by means of an auxiliary converter. The auxiliary converter connects a compensation current path, that runs in parallel to each resonant circuit and each AC current backflow path, and in which a capacitance is arranged, via two pulsed switches alternately to one of the input lines of the inverter or an intermediate potential line at which an intermediate potential is present, or alternately to the two input lines of the inverter bridge in an electrically conductive way. Correspondingly, the auxiliary converter comprises a bridge between the input lines of the entire inverter or the inverter bridge. Controlling the auxiliary converter may easily be carried out in such a way that the total summation current flowing over all resonant circuits and all AC current backflow paths is compensated to zero, that, due to the fact that the currents flowing along these paths are alternating currents, may easily be monitored, for example by an induction coil in which a current is induced, when an alternating magnetic field is induced in a ring core enclosing all current paths as a summation or differential current transformer.

Besides the capacitance, an inductance may also be provided in the compensation current path to adjust the passive properties of the compensation path. In one embodiment, such an inductance is on that side of the capacitance that points towards the switches of the auxiliary converter.

Additionally, for tuning its passive properties, the compensation current path, on that side with the pulsed switches, may be connected to one of the input lines of the inverter or to an intermediate potential line at which an intermediate potential is present or to one of the input lines of the inverter bridge via a capacitance.

On that side opposing the pulsed switches, the compensation current path is connected to one of the input lines of the inverter bridge or to one of the input lines of the inverter or to an intermediate potential line at which an intermediate potential is present, respectively.

Often, one of the input lines of the inverter will be grounded or connected to neutral to define the electric potential of these input lines. With the compensation current path, however, it is also possible to adjust the electric potential of the input lines of the inverter with regard to ground without a direct connection to connection ground. In this case, the capacitance normally arranged in the compensation current path is replaced by an inductance that may be supplemented with a resistor or a further switch or a fuse.

During start-up of the new inverter, i.e. as long as the intermediate voltage link is not yet charged to a voltage that suitably limits the currents flowing through the components of the DC/DC converter while its pulsed switches are closed, the operation frequency and/or the duty cycle of the pulsed switches may be strongly reduced to avoid dangerous or damaging currents from flowing through the components of the DC/DC converter. Alternatively or additionally the intermediate voltage link may be pre-charged from the AC power grid.

The switches of the DC/DC converter of the inverter of the present invention may, for example, be IGBTs, MOSFETs or JFETs. The rectifier diodes of the DC/DC converter may, for example, be Si, SiC, or GaN diodes depending on the actual operation conditions of the DC/DC converter.

The inverter bridge of the inverter of the present invention may, for example, comprise IGBTs, MOSFETs or SiC-JFETs. The freewheeling diodes of the inverter bridge may, for example, be SiC diodes.

The inverter of the present invention may additionally comprise a further DC/DC converter at its input end, like for example a boost or buck converter.

The transformerless inverter 1 illustrated in FIG. 1 operates to feed electric energy from a DC current source 2, for example, from a photovoltaic system 3, into an AC power grid 4 which is single-phase in this embodiment. The inverter 1 comprises a DC/DC converter 5 that converts an input DC voltage $U_E$ present between the input lines 6 and 7 of the inverter 1 into an intermediate link DC voltage $U_Z$. The intermediate link DC voltage $U_Z$ is present between the input lines 8 and 9 of an inverter bridge 10 of the inverter 1, which feeds AC current into the AC power grid 4 with a sine filter 11 being connected in between. The inverter bridge 10 inverts the intermediate link voltage $U_Z$ into an output AC voltage. The inverter bridge 10 is made as an H5 circuit in this embodiment and comprises a total of five pulsed switches $V_1$ to $V_5$ that are controlled in a generally known way to feed electric energy originating from the intermediate voltage link DC voltage $U_Z$ into the AC power grid 4. The DC/DC converter 5 includes a resonant circuit 12 comprising a resonance inductance $L_{r1}$ and a resonance capacitance $C_{r1}$. At its input, via two pulsed switches $S_1$ and $S_2$, the resonant circuit 12 is alternately connected to the input lines 6 and 7 of the inverter 1 in an electrically conductive way. At its output, an alternating electrically conductive connection of the resonant circuit 12 to the input lines 8 and 9 of the inverter bridge 10 takes place via rectifier diodes $D_1$ and $D_2$. In parallel, or more exactly said in anti-parallel to the resonant circuit 12, an AC current backflow path 13 is provided which is connected to the same lines 6 and 7, on the one hand, and 8 and 9, on the other hand, as the resonant circuit 12 and which allows the current flowing off via the resonant circuit 12 to flow back to the DC current source 2. In the AC current backflow path 13 a capacitance $C_{r2}$ is provided which, together with the resonance capacitance $C_{r1}$, provides for a complete galvanic separation between the input lines 6 and 7 of the inverter 1 and the input lines 8 and 9 of the inverter bridge 10. Additionally, in the embodiment of the inverter 1 according to FIG. 1, an additional galvanic separation in a capacitive way results with regard to the AC current backflow path 13, because the AC current backflow path 13 is both connected to the input lines 6 and 7 and to the input lines 8 and 9 via two capacitances $C_{11}$ and $C_{12}$, and $C_{21}$ and $C_{22}$, respectively. Further, in FIG. 1, a resonance inductance $L_{r2}$ is provided in the AC current backflow path 13 which makes the AC current backflow path 13 a further resonant circuit 14. By means of a switch $S_{5a}$, the resonant circuit 12 and the AC current backflow path 13 are connectable to each other in an electrically conductive way behind their branchings towards the input lines 6 and 7 via the switches $S_1$ and $S_2$, and via the capacitances $C_{11}$ and $C_{12}$, respectively, as seen from a point of view of the AC current source 2. By pulsed connection of the resonant circuit 12 and the AC current backflow path 13 at this point, the intermediate link voltage $U_Z$ may be reduced to provide for a further adjustability of the inverter 1 to the input DC voltage $U_E$ generated by the DC current source 12 besides operating the switches $S_1$ and $S_2$ relative to the resonance frequency of the resonant circuit 12. The basic conversion of the inverter 1 between the input DC voltage $U_E$ and the intermediate link voltage $U_Z$ is about 1:1, in one embodiment. By a pulsed switch $S_{5b}$, via which the resonant circuit 12 and the AC current backflow path 13 are connectable to each other in an electrically conductive way in front of their branchings towards the input lines 8 and 9 of the inverter bridge 10 at their output side, the intermediate link DC voltage $U_Z$ may be increased instead. In total, already the embodiment of the inverter 1 according to FIG. 1 comprises a plurality of options to influence the intermediate link DC voltage U.

Figure 2:
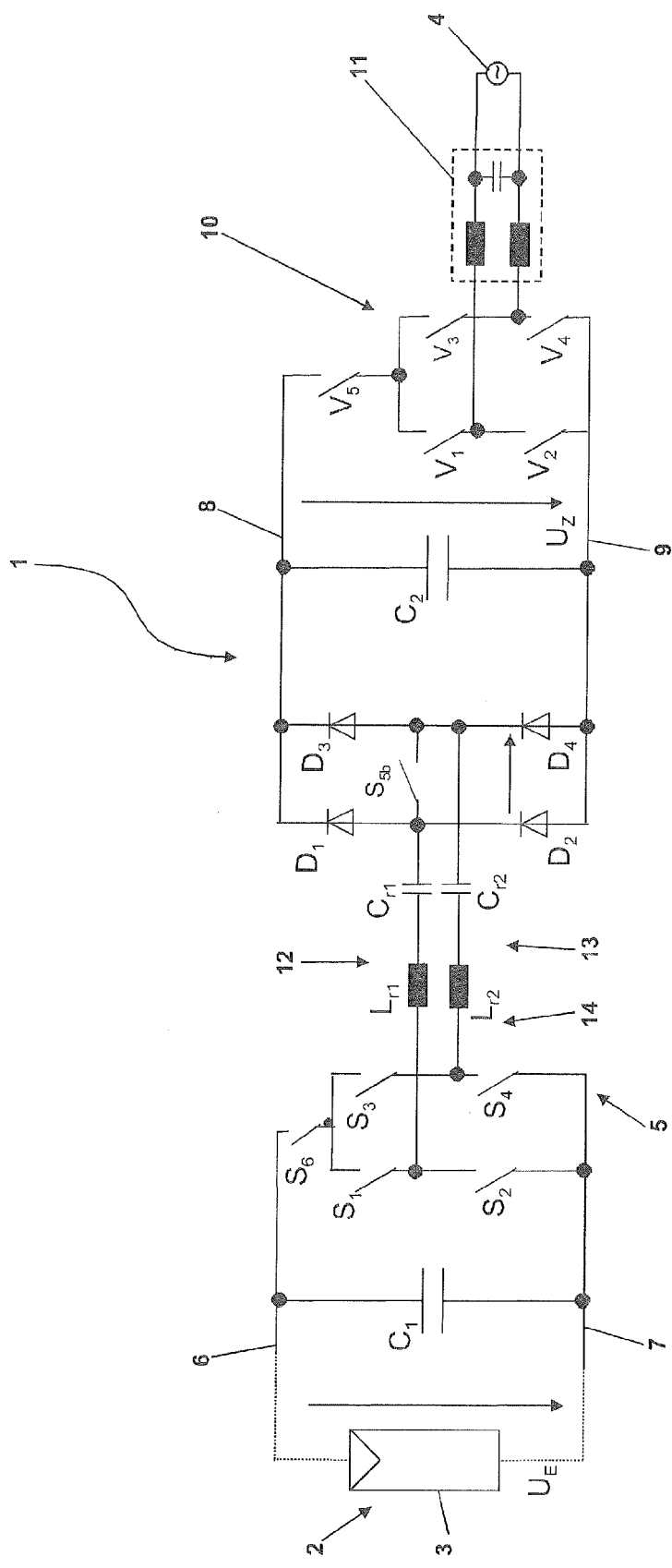
FIG. 2 illustrates a modification to the transformerless inverter according to FIG. 1 with regard to the connection of the AC current backflow path.

The embodiment of the transformerless inverter 1 according to FIG. 2 differs from that one according to FIG. 1 with regard to the connection of the AC current backflow path 13 made as a further resonant circuit 14. Instead of via capacitances, the AC current backflow path 13 is here connected to the input lines 6 and 7 of the inverter 1 via two further pulsed switches $S_3$ and $S_4$ at its input. At the output, the AC current backflow path 13 is connected via rectifier diodes $D_3$ and $D_4$ to the input lines 8 and 9 of the inverter bridge 10. Thus, the AC current backflow path 13 is made in the same way as the resonant circuit 12. With the switches $S_1$ and $S_2$, and $S_3$ and $S_4$, respectively, these two resonant circuits 12 and 14 are forced to anti-phased oscillations. To compensate for the buffer effects of the removed capacitances $C_{11}$ and $C_{12}$ as well as $C_{21}$ and $C_{22}$ according to FIG. 1, buffer capacitances $C_1$ and $C_2$ are provided between the input lines 6 and 7 and the input lines 8 and 9, respectively, in the inverter 1 according to FIG. 2. In that the AC current backflow path, at least at one side via the pulsed switches $S_3$ and $S_4$, is also connected to the input lines 6 and 7, there is a further option of influencing the total current flowing via the resonant circuit 12 and the AC current backflow path 13. Further, instead of the switch $S_{5a}$, a switch $S_6$ is provided in FIG. 2 which may also be pulsed for decreasing the intermediate link DC voltage $U_z$, and which complements the switches $S_1$ to $S_4$ in form of an H5 circuit.

Figure 3:
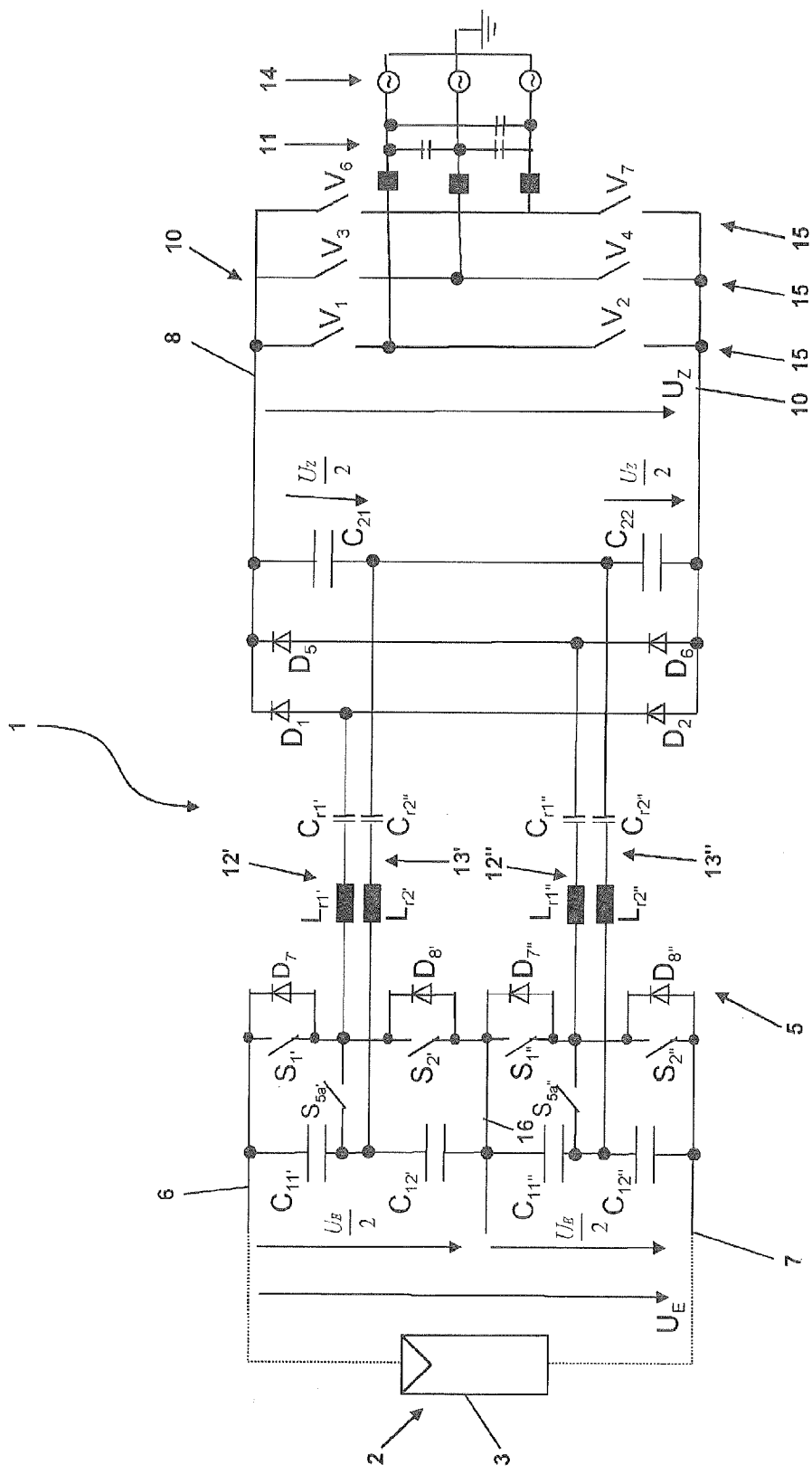
FIG. 3 illustrates an embodiment of the transformerless inverter comprising two resonant circuits of the DC/DC converter connected in parallel and an inverter bridge feeding into a three-phase AC power grid.

As compared to the embodiment according to FIG. 1, the transformerless inverter 1 according to FIG. 3 is varied with regard to other details than that one according to FIG. 2. At first, the AC power grid 4 in which electric energy from the DC current source 2 is fed, is a three-phase AC power grid here. Correspondingly, the inverter bridge 10 is made with three half-bridges 15. Free-wheeling diodes which, however, are not depicted in FIG. 3 may be connected in parallel to the switches $V_1$ to $V_4$ as well as $V_6$ and $V_7$ of the inverter bridge 10. The DC/DC converter 5 comprises two resonance circuits 12' and 12" here, which are as such made identical with resonance inductances $L_{r1'}$ and $L_{r1''}$ and resonance capacitances $C_{r1'}$ and $C_{r1''}$, and which, in parallel to each other, are connected to the input lines 8 and 9 of the inverter bridge 10 via rectifier diodes $D_1$ and $D_2$, and $D_5$ and $D_6$, respectively. AC current backflow paths 13' and 13" each associated with one of the two resonant circuits 12' and 12" are also connected in parallel at their outputs, i.e. to the input lines 8 and 9 of the inverter bridge 10. They are even connected together and connected to these input lines via common capacitances $C_{21}$ and $C_{22}$. At their inputs, however, the resonance circuits 12 and the associated AC current backflow paths 13 are not connected to both input lines 6 and 7 of the inverter 1, but each only to one of these two input lines 6 and 7 and to one intermediate potential line 16 at which a potential between the input lines 6 and 7 is present. The potential present at this intermediate potential line 16 is averaged by the capacitances $C_{11'}$ and $C_{12'}$ on the one hand and $C_{11''}$ and $C_{12''}$ on the other hand. Correspondingly, the inverter 1 has a basic conversion of 2:1. Further, free-wheeling diodes $D_7$ and $D_8$ are connected in parallel to the switches $S_1$ and $S_2$ by which the resonant circuits 12 are connected to the input lines 6 and 7 or the intermediate potential line 16, respectively.

Figure 4:
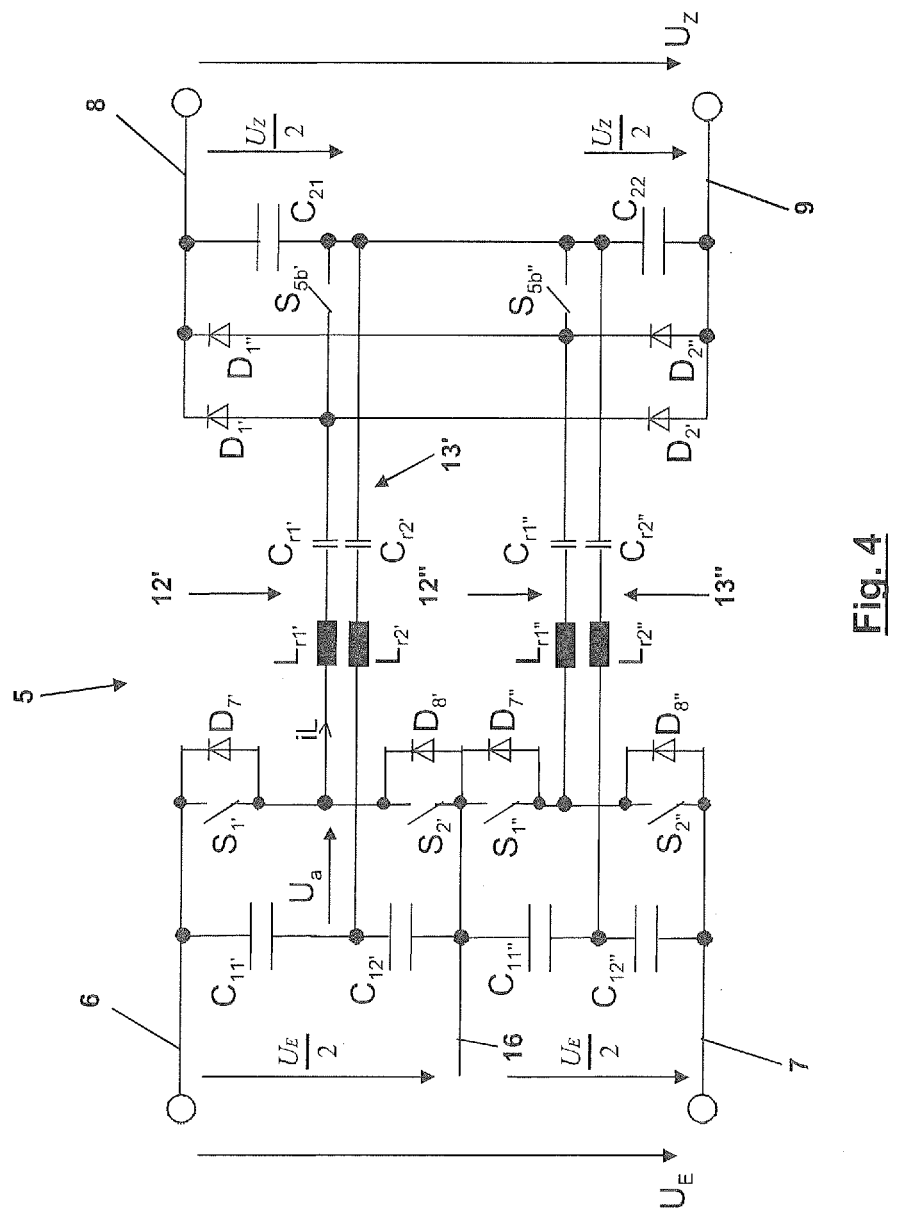
FIG. 4 illustrates a modification to the DC/DC converter according to FIG. 3.

FIG. 4 shows an alternative embodiment to the DC/DC converter 5 according to FIG. 3. Whereas according to FIG. 3 switches $S_{5a'}$ and $S_{5a''}$ are provided for connecting the resonant circuit 12 and the associated AC current backflow path 13 at the input, switches $S_{5b'}$ and $S_{5b''}$ are provided here to connect the resonant circuits 12 and the associated AC current backflow paths 13 in a pulsed fashion at their output. In this way, instead of the voltage decreasing effect of the switches $S_{5a'}$ and $S_{5a''}$, a voltage increasing effect on the intermediate link voltage $U_Z$ is provided.

Figure 5:
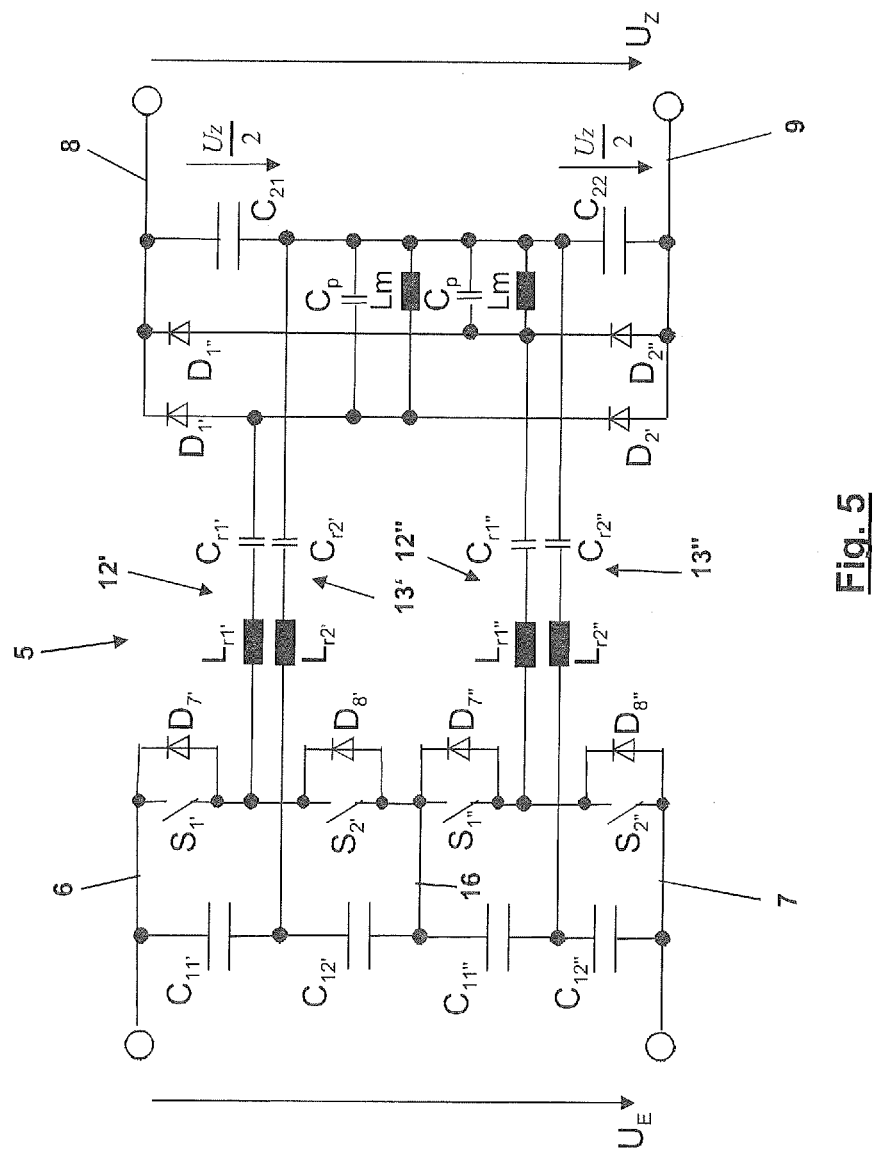
FIG. 5 illustrates a further modification to the DC/DC converter according to FIG. 3.

In the embodiment of the DC/DC converter 5 according to FIG. 5, instead of the switches $S_{5b}$ according to FIG. 4, additional capacitances $C_p$ and inductances $L_m$ are provided between the resonant circuits 12 and the associated AC current backflow paths 13 which have a positive influence on the passive properties of the DC/DC converter 5. Instead of providing both the capacitances $C_p$ and the inductances $L_m$, only the capacitances $C_p$ or only the inductances $L_m$ may be provided. At this point it has to be emphasized that the resonance inductances $L_{r2}$ in the AC current backflow paths 13 are generally optional.

Figure 6:
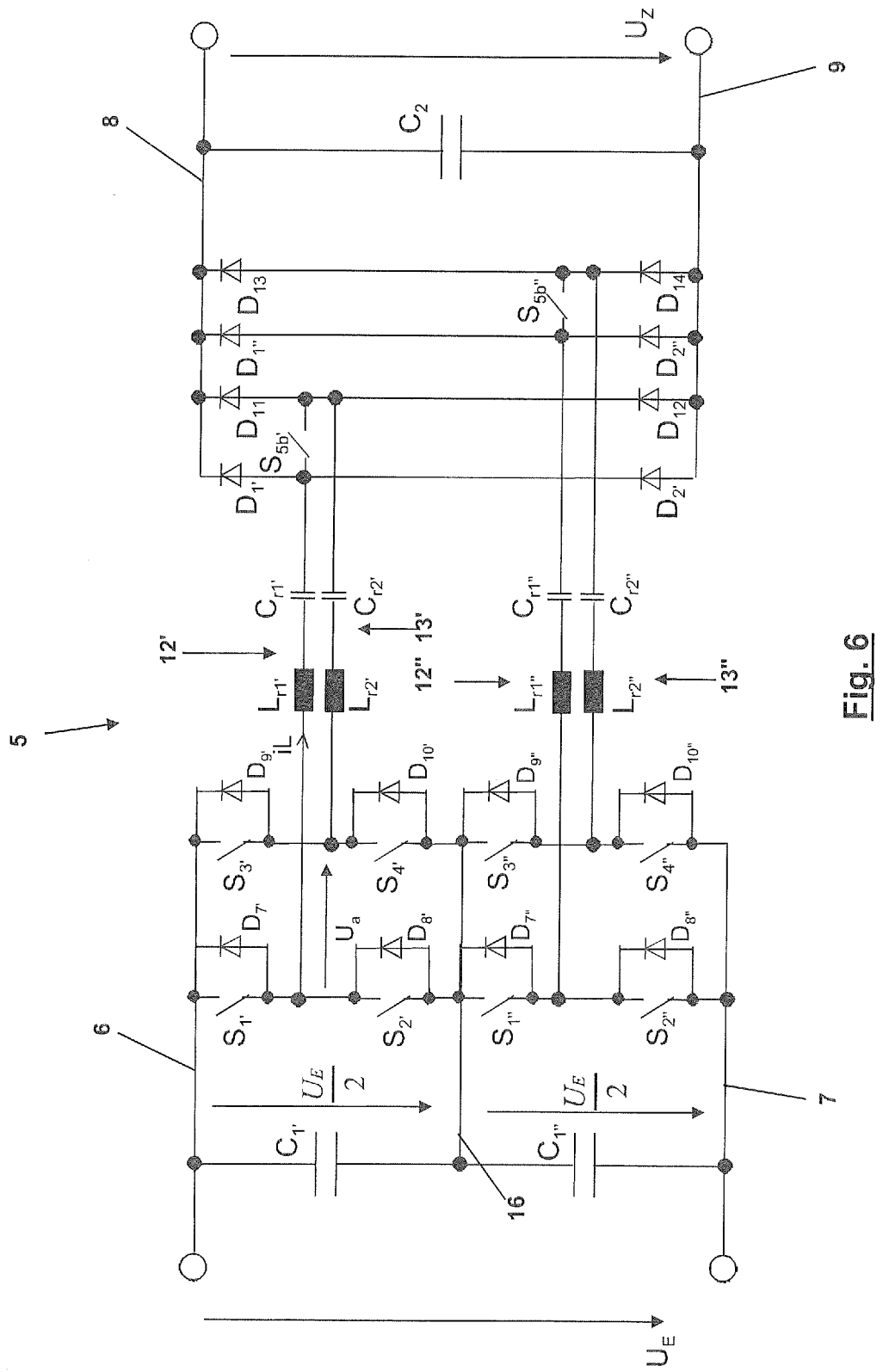
FIG. 6 illustrates even a further modification to the DC/DC converter according to FIG. 3 in which, besides the two resonant circuits, the AC current backflow paths are also connected via pulsed switches at their input.

In the DC/DC converter according to FIG. 6 not only the resonant circuits 12 but also the AC current backflow paths 13 are connected to the input lines 6 and 7 or the intermediate potential line 16 via switches S. Again, free-wheeling diodes $D_9$ and $D_{10}$ are connected in parallel to the switches $S_3$ and $S_4$. The AC current backflow paths 13 are each connected to the input lines 8 and 9 via additional rectifier diodes $D_{11}$ to $D_{14}$. A buffer capacitance $C_2$ is provided between the input lines 8 and 9 of the inverter bridge which is not depicted here. A buffer capacitance divided into partial capacitances $C_{1'}$ and $C_{1''}$ is provided between the input lines 6 and 7, the partial capacitances $C_{1'}$ and $C_{1''}$ and average the potential between the input lines 6 and 7 for the intermediate potential line 16.

Figure 7:
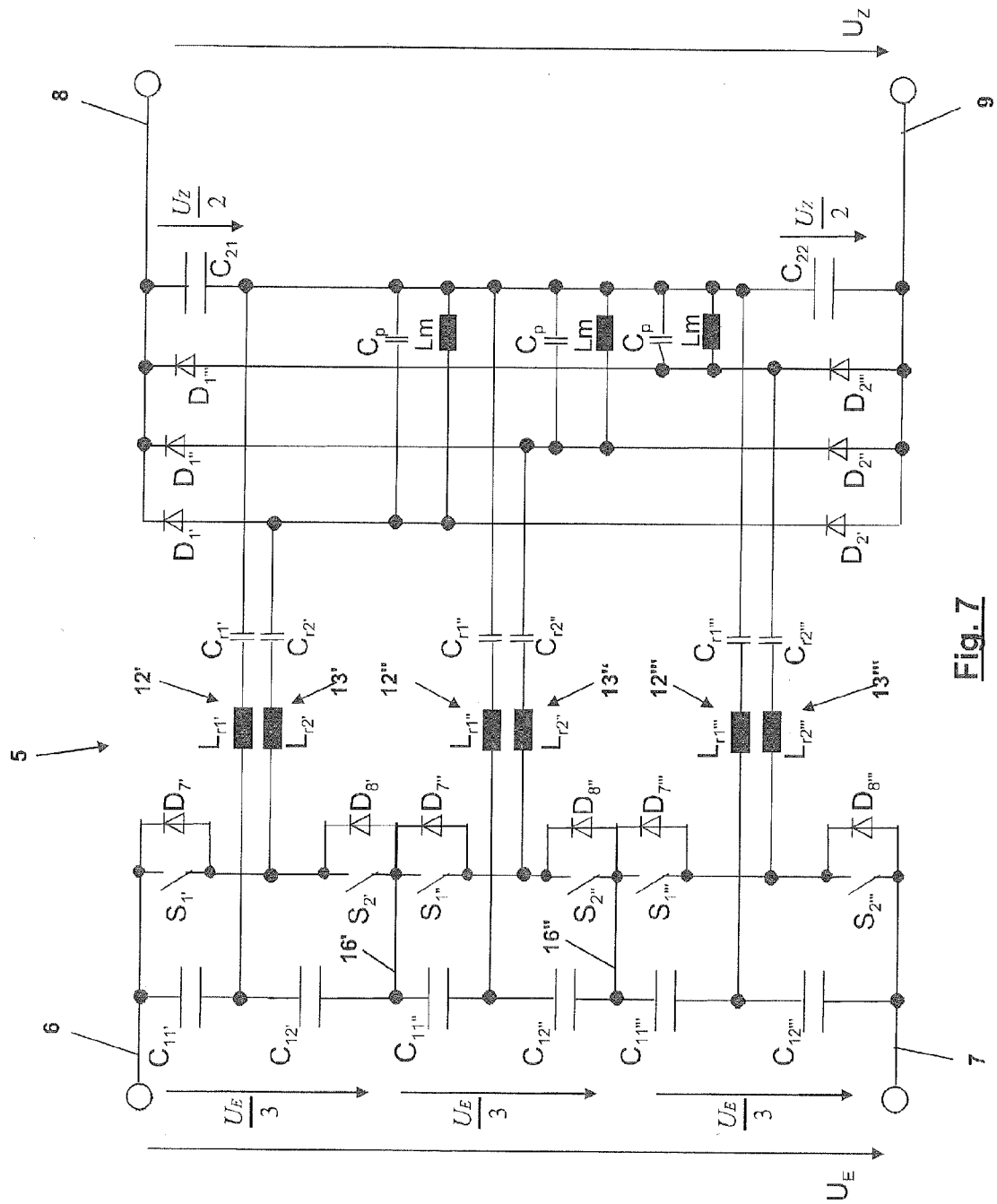
FIG. 7 illustrates a DC/DC converter as a modification to the DC/DC converter according to FIG. 5, a total of three resonant circuits and associated AC current backflow paths being provided.

The embodiment of the DC/DC converter 5 according to FIG. 7 is a variant of the DC/DC converter 5 according to FIG. 5 in which, instead of two resonant circuits 12 with associated AC current backflow paths 13, three such resonant circuits 12 and AC current backflow paths 13 are provided so that a total basic conversion between the input DC voltage $U_E$ and the intermediate link DC voltage $U_Z$ of 3:1 is achieved. Here, intermediate potential lines 16' and 16" that provide two different potentials between the input lines 6 and 7 are provided. The resonant circuit 12" and the associated AC current backflow path 13" are only connected to these two intermediate potential lines 16 at their inputs.

Figure 8:
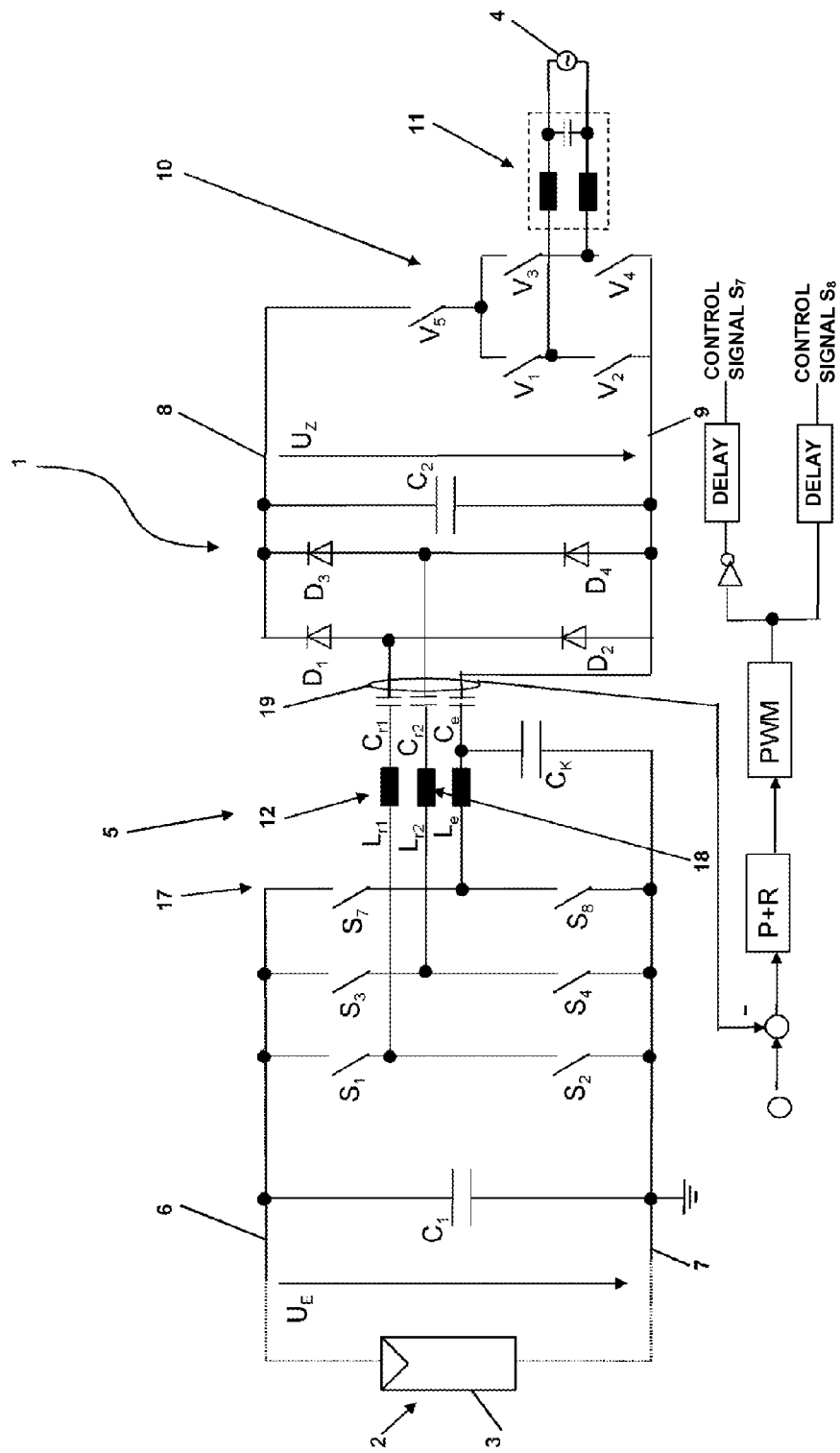
FIG. 8 illustrates an embodiment of the transformerless inverter of the present invention comprising an auxiliary converter for ground current compensation in a first embodiment.

Basically, FIG. 8 illustrates the setup of the transformerless inverter 1 according to FIG. 2, with the switches $S_5$ and $S_{5b}$ being omitted. Additionally, an auxiliary converter 17 is provided to compensate for a summation current of the currents flowing over the resonant circuit 12 and the AC current backflow path so that they do not provoke any current via ground. The auxiliary converter comprises two pulsed switches S7 and S8 here, by which a compensation current path 18, at its input, is alternately connected to the input lines 6 and 7. The compensation current path 18 runs in parallel to the resonant circuit 12 and the AC current backflow path 13. In the compensation current path 18, a capacitance $C_e$ is arranged via which the compensation current path 18 is connected to the input line 9 of the inverter bridge 10, here. Additionally, via a coupling capacitance $C_K$, the compensation current path 18 is connected to the input line 7 which is grounded here, and an inductance $L_e$ is provided in the compensation current path 18. By means of the capacitances $C_e$ and $C_K$, the galvanic separation is also ensured along the compensation current path 18. In FIG. 8 a controller 20 for operating the pulsed switches $S_7$ and $S_8$ of the auxiliary converter 17 is illustrated. By means of a ring core 19 which may be a ferrite ring, and an induction coil not depicted here which serve as a summation current transformer, an input signal for the controller 20 is generated, which controls the summation current of all currents flowing over the DC/DC converter 5 to get down to zero.

Figure 9:
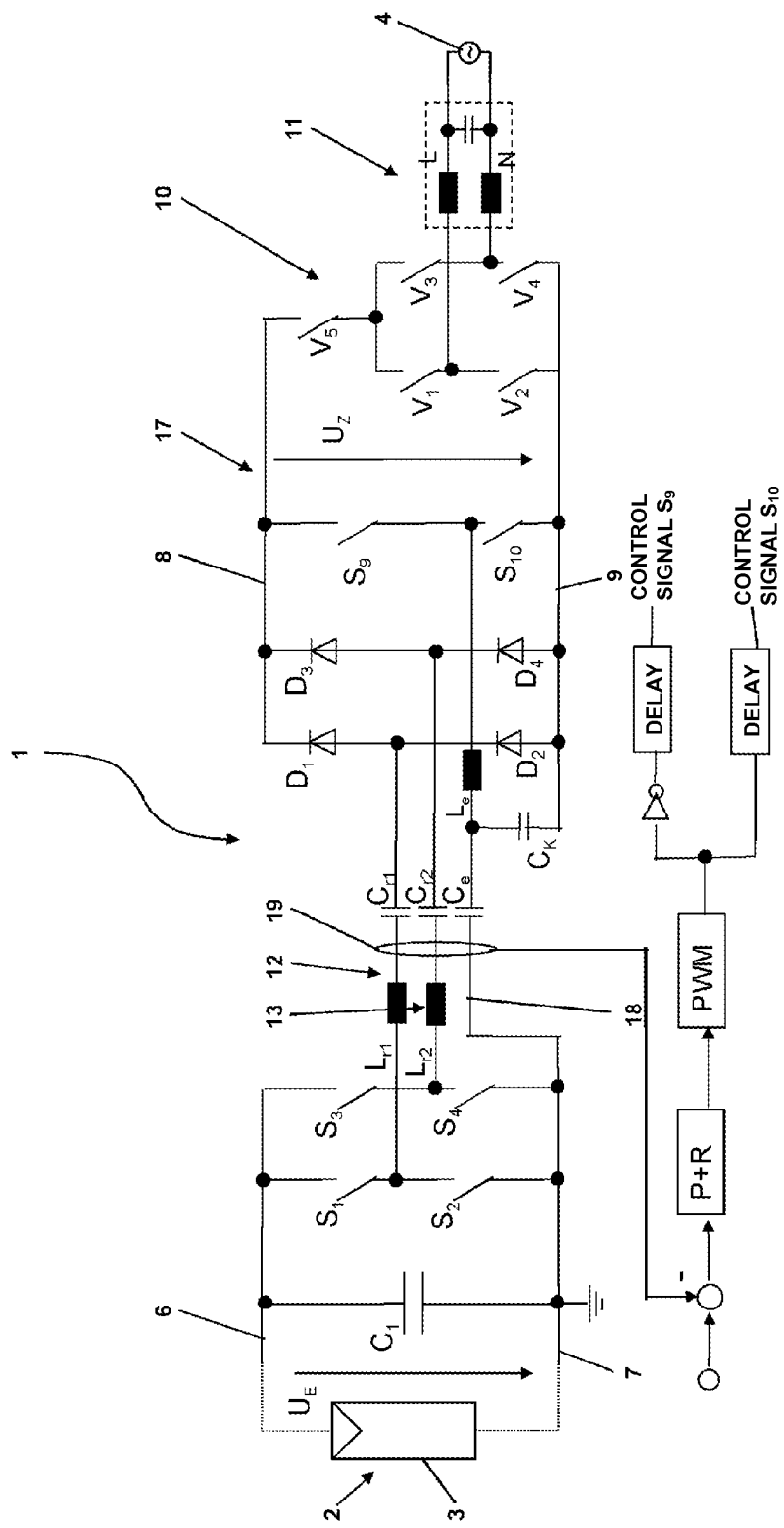
FIG. 9 illustrates an embodiment of the transformerless inverter of the present invention comprising an auxiliary converter for ground current compensation in a second embodiment.

In the embodiment of the transformerless inverter 1 according to FIG. 9, in contrast to FIG. 8, the compensation current path 18 with the auxiliary converter 17 is connected to the input lines 8 and 9 of the inverter bridge 10 via pulsed switches $S_9$ and $S_{10}$. Correspondingly, it comprises the inductance $L_e$ at the output side of the capacitance $C_e$, and the coupling capacitance $C_K$ is arranged towards the input line 9 of the inverter bridge 10. The compensation current path 18 is here directly connected to the input line 7. The controller 20 for the switches $S_9$ and $S_{10}$, however, essentially corresponds to the controller 20 for the switches $S_7$ and $S_8$ according to FIG. 8, only one of several options of making the controller 20 being indicated here. If a plurality of resonant circuits 12 and associated AC current backflow paths 13 are connected in parallel, preferably only a single auxiliary converter 17 and a single compensation current path 18 are provided, although, in general, one such combination of an auxiliary converter 17 and a compensation current path 18 may be provided per pair of resonance current path 12 and associated AC current backflow path 13 to compensate each partial summation current flowing over such a pair to zero.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

The invention claimed is:

1. A transformerless inverter configured to feed electric energy from a DC current source into an AC power grid, the inverter comprising
    an inverter bridge configured to receive an intermediate link DC voltage and generate an output AC voltage at an output thereof, and
    a DC/DC converter connected upstream of the inverter bridge, wherein the DC/DC converter is configured to receive an input DC voltage present between two input lines of the inverter and convert the input DC voltage into the intermediate link DC voltage, and present the intermediate link DC voltage between two input lines of the inverter bridge; and
    at least one capacitance connected between the two input lines of the inverter bridge, thus providing an intermediate voltage link;
    the DC/DC converter comprising at least one resonant circuit that comprises a resonance inductance and a resonance capacitance, wherein the resonant circuit at its input is selectively connected from among one of the two input lines of the inverter and an intermediate potential line at which a potential between the input lines of the inverter is present, based on a position or a state of at least two pulsed switches, and
    wherein the input lines of the inverter and the input lines of the inverter bridge are galvanically separated from one another in a capacitive way, wherein the resonant circuit is undivided, and wherein the resonant circuit, at its output, is connected to the two input lines of the inverter bridge.

2. The inverter of claim 1, wherein the at least one resonant circuit of the DC/DC converter is configured to operate at a resonance frequency that is set to an operation frequency of the at least one resonance circuit in a resonant mode.

3. The inverter of claim 1, wherein the at least one resonant circuit of the DC/DC converter has a resonance frequency and wherein the at least one resonant circuit is operated at an operation frequency in a range from 80% to 120% of its resonance frequency.

4. The inverter of claim 3, wherein the at least one resonant circuit comprises a plurality of resonant circuits, and wherein all the resonant circuits of the DC/DC converter have the same resonance frequency and wherein all the resonant circuits are operated at the same operation frequency.

5. The inverter of claim 3, wherein the at least two pulsed switches are pulsed at the operation frequency.

6. The inverter of claim 5, wherein the at least two pulsed switches are pulsed at a duty cycle in a range from 25% to 50%.

7. The inverter of claim 3, wherein the resonance frequency of the at least one resonant circuit of the DC/DC converter is in a range from 15 kHz to 150 kHz.

8. The inverter of claim 1, wherein the resonance capacitance of the at least one resonant circuit of the DC/DC converter is in a range from 100 nanofarad to 10 microfarad.

9. The inverter of claim 1, wherein the resonance inductance of the at least one resonant circuit of the DC/DC converter is in a range from 1 microhenry to 250 microhenry.

10. The inverter of claim 1, wherein the resonant circuit, via pulsed switches and/or rectifier diodes, is alternately connected to the input lines of the inverter bridge.

11. The inverter of claim 1, wherein the at least one resonant circuit comprises two resonant circuits that each connect, at an input portion, via two pulsed switches, respectively, to one of the two input lines of the inverter and to an intermediate potential line at which an intermediate potential is present between the two input lines, and at an output portion, alternately to the two input lines of the inverter bridge.

12. The inverter of claim 1, wherein the one resonant circuit comprises the resonant circuits, and wherein one resonant circuit thereof is, via two pulsed switches, is alternately connected to two intermediate potential lines at its input, and alternately to the two input lines of the inverter bridge at its output.

13. A transformerless inverter configured to feed electric energy from a DC current source into an AC power grid, the inverter comprising:
an inverter bridge configured to receive an intermediate link DC voltage and generate an output AC voltage at an output thereof, and
a DC/DC converter connected upstream of the inverter bridge, wherein the DC/DC converter is configured to receive an input DC voltage present between two input lines of the inverter and convert the input DC voltage into the intermediate link DC voltage, and present the intermediate link DC voltage between two input lines of the inverter bridge;
wherein the inverter bridge is configured to invert the intermediate link DC voltage present at its input lines into the output AC voltage;
the DC/DC converter comprising at least one resonant circuit that comprises a resonance inductance and a resonance capacitance, and wherein the resonant circuit, at its input, is selectively connected from among one of the two input lines of the inverter and an intermediate potential line at which an intermediate potential between the input lines of the inverter is present, based on a position or a state of at least two pulsed switches; and
at least one AC current backflow path connected between the input lines of the inverter or the intermediate potential line at an input thereof, and the input lines of the inverter bridge at an output thereof, wherein the AC current backflow path comprises a capacitance having one terminal branching towards the input lines of the inverter or to the intermediate potential line, and having another terminal branching towards the two input lines of the inverter bridge.

14. The inverter of claim 13, wherein the AC current backflow path comprises an AC current backflow path associated with each resonant circuit of the at least one resonant circuit.

15. The inverter of claim 13, wherein the AC current backflow path is connected to the input lines of the inverter or to the intermediate potential line via two capacitances at its input, and to the input lines of the inverter bridge via two further capacitances at its output.

16. The inverter of claim 13, wherein the at least one AC current backflow path comprises several AC current backflow paths connected to the input lines of the inverter bridge via the same two capacitances at their respective outputs.

17. The inverter of claim 13, wherein the AC current backflow path is connected via two switches alternately to the two input lines of the inverter or to the intermediate potential line at its input, and/or alternately to the input lines of the inverter bridge at its output, wherein at its output the AC current backflow path is connected to the input lines of the inverter bridge via two further switches and/or diodes.

18. The inverter of claim 13, wherein the AC current backflow path comprises a further resonant circuit comprising a resonance inductance and a resonance capacitance.

19. The inverter of claim 14, further comprising at least one pulsed connection switch is provided between each resonant circuit and its associated AC current backflow path at their respective inputs towards the input lines of the inverter or towards the intermediate potential line and/or at their outputs towards the two input lines of the inverter bridge.

20. The inverter of claim 14, wherein each resonant circuit and its associated AC current backflow path are connected to each other at the output towards the two input lines of the inverter bridge via a capacitance and/or an inductance.

21. The inverter of claim 17, wherein the resonant circuit and the associated AC current backflow path, at their inputs, via each of two pulsed switches are connected to one of the input lines of the inverter or to an intermediate potential line at which an intermediate potential is present between the input lines, wherein a further pulsed switch is provided in one of the input lines or the intermediate potential line.

22. The inverter of claim 13, further comprising an auxiliary converter configured to compensate for a current flowing off via all resonant circuits and AC current backflow paths connecting a compensation current path that is arranged in parallel to each resonant circuit and to each AC current backflow path and in which a capacitance is arranged, via two pulsed switches alternately to one of the input lines of the inverter or to an intermediate potential line at which an intermediate potential is present between the input lines, or alternately to the two input lines of the inverter bridge, wherein the compensation current path, on its end opposite to the two pulsed switches, is connected to one of the input lines of the inverter bridge or one of the input lines of the inverter or an intermediate potential line at which an intermediate potential is present, respectively.

23. The inverter of claim 22, wherein an inductance is provided in each compensation current path, and wherein the compensation current path, at its end with the pulsed switches is connected to one of the input lines of the inverter or to an intermediate potential line at which an intermediate potential is present, or to one of the input lines of the inverter bridge via a coupling capacitance.

24. The inverter of claim 13, further comprising an auxiliary converter configured to compensate for a current flowing off via all resonant circuits and AC current backflow paths by connecting a compensation current path, that is arranged in parallel to each resonant circuit and to each AC current backflow path, and in which an inductance is arranged, via two pulsed switches, alternately to one of the input lines of the inverter or to an intermediate potential line at which an intermediate potential is present between the input lines, or alternately to the two input lines of the inverter bridge, wherein the compensation current path, on its end opposite to the two pulsed switches, is connected to one of the input lines of the inverter bridge or one of the input lines of the inverter or an intermediate potential line at which an intermediate potential is present, respectively.

25. The inverter of claim 13, wherein the input lines of the inverter and the inputs lines of the inverter bridge are galvanically separated from one another in a capacitive way.

26. The inverter of claim 13, wherein the at least one AC current backflow path is connected in a parallel configuration to the at least one resonant circuit and configured to feed back current from the at least one resonant circuit to the DC current source.

* * * * *